No. 656,693. Patented Aug. 28, 1900.
S. V. DOUGLAS.
CLOTHES DRIER.
(Application filed Feb. 14, 1900.)
(No Model.)
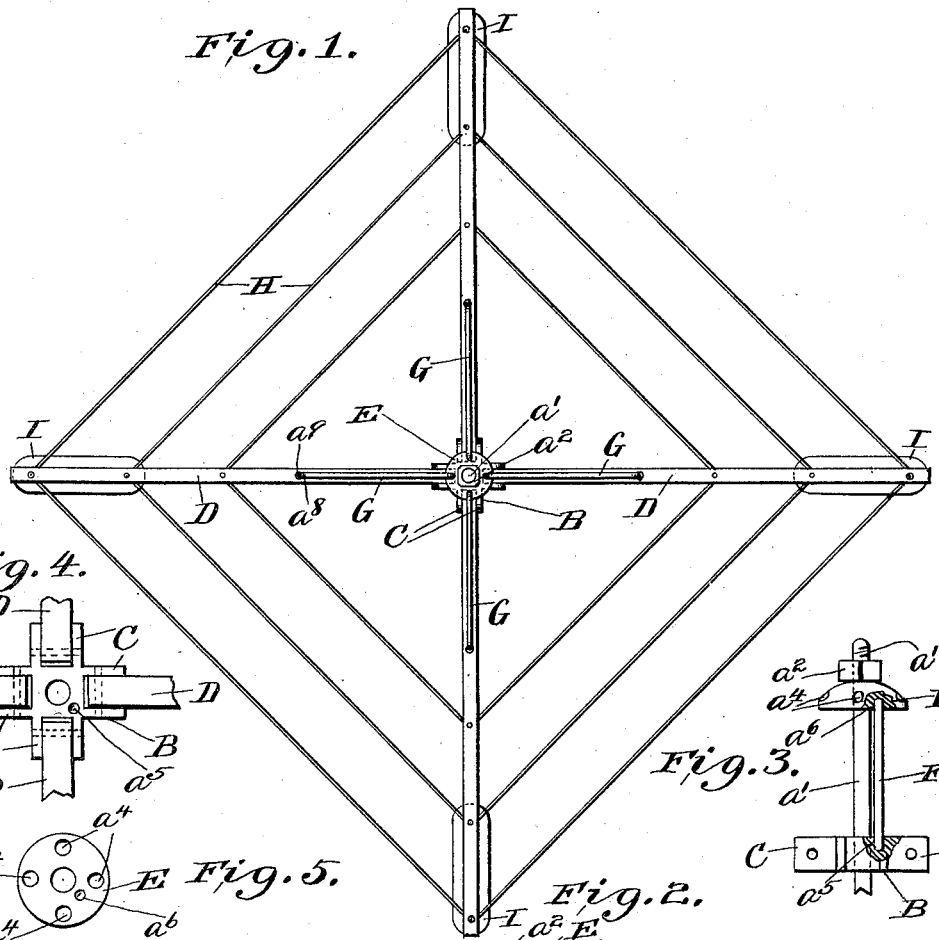
Fig. 1.
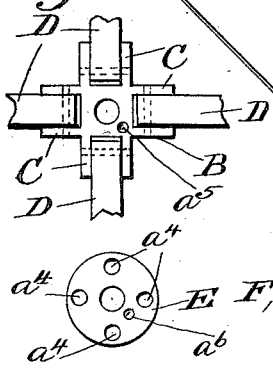
Fig. 4.
Fig. 5.
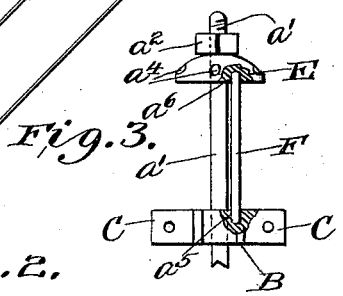
Fig. 3.
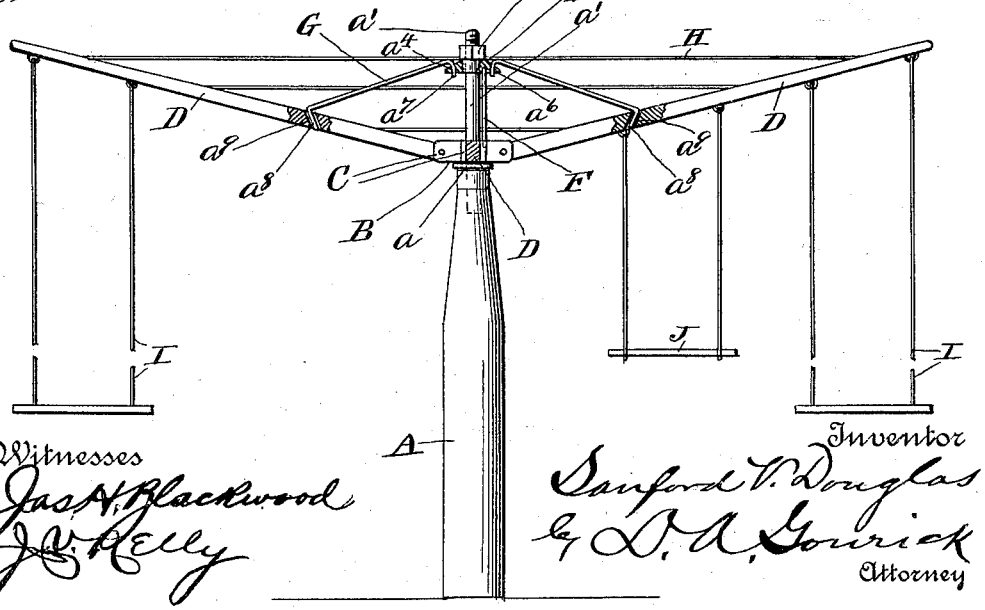
Fig. 2.
Witnesses
Jas. H. Blackwood
J. V. Kelly
Inventor
Sanford V. Douglas
by D. A. Gourick
Attorney
THE NORRIS PETERS CO., PHOTO-LITHO., WASHINGTON, D. C.

UNITED STATES PATENT OFFICE.

SANFORD V. DOUGLAS, OF BLOOMINGTON, NEBRASKA.

CLOTHES-DRIER.

SPECIFICATION forming part of Letters Patent No. 656,693, dated August 28, 1900.

Application filed February 14, 1900. Serial No. 5,181. (No model.)

*To all whom it may concern:*

Be it known that I, SANFORD V. DOUGLAS, a citizen of the United States, residing at Bloomington, in the county of Franklin and State of Nebraska, have invented certain new and useful Improvements in Clothes-Driers, of which the following is a specification.

My invention relates to an improvement in clothes-driers, and has for its object to provide a device which is simple and inexpensive in construction and easy to operate.

It consists in the features and combination of features more fully hereinafter described and claimed.

Referring to the drawings, Figure 1 is a top plan view; Fig. 2, a side elevation, partly in section, with one of the arms removed; Fig. 3, a detail view of the hub and circular plate, partly in section; Figs. 4 and 5, detail plan views of the hub and circular plate.

In the drawings, in which like letters of reference denote like parts throughout the several views, A represents a central standard or post provided with a shoulder $a$ and a spindle $a'$, screw-threaded at its upper end and having a nut $a^2$ screwed thereon. B is a hub mounted on the spindle and resting on a washer on the shoulder $a$ and provided with four pairs of ears C, between which the inner ends of the arms D are pivotally secured.

E is a circular plate mounted on the spindle above the hub and provided with four holes $a^4$ therein.

F is a rod made of gas-pipe or other suitable material, the opposite ends of which are seated in recesses $a^5$ $a^6$ in the hub B and plate E, respectively. Said rod is for the purpose of sustaining the plate and keeping the hub and plate the proper distance apart.

G shows supporting-braces with hooked ends $a^7$ $a^8$. The ends $a^7$ are adapted to engage the holes $a^4$ of the plate E and the ends $a^8$ the sockets $a^9$ in the arms, said sockets being made at an angle to the upper surface of the said arms for securely retaining the hooked ends $a^8$ of the supporting-braces therein.

H shows cords or lines attached to the arms D in any suitable manner.

I shows swings, and J a trapeze, which may be attached to the arms of the clothes-drier when it is desired to use the same as a pleasure-swing or as a revolving merry-go-round.

The several parts are assembled as follows: The washer is first put on the spindle and pushed down until it seats itself on the shoulder $a$, the hub is inserted on the spindle and placed on top of the washer, the circular plate also inserted on the spindle, the rod F placed between the plate and hub, with its ends seated in the recesses in the same, one hooked end of each of the supporting-braces is inserted in one of the holes in the plate and the opposite end in one of the sockets in the arms, and then the nut is screwed on the top of the spindle and the clothes-drier is ready for use.

When it is desired to close the clothes-drier up, so that it can be put away when not in use, it is only necessary to remove the supporting-braces and fold the arms upward and it will be very compact and occupy very little space.

The details of construction may be changed somewhat without departing from the spirit of my invention, and therefore I do not wish to confine myself to the precise construction shown.

Having thus described my invention, what I claim is—

In a clothes-drier, a standard having a spindle, a hub provided with pivoted arms, and having a recess on its upper surface; a plate provided with holes, and having a recess on its under surface, said hub and plate both mounted on said spindle, a detachable rod one end adapted to be seated in the recess of the hub, and the opposite end in the recess of the plate, braces connecting the pivoted arms with the plate and a nut adapted to be secured on the top of said spindle to hold the ends of said rod in the recesses of the plate and hub, substantially as shown and described.

In testimony whereof I hereto affix my signature in the presence of two witnesses.

SANFORD V. DOUGLAS.

Witnesses:
ALBERT R. PECK,
J. B. STATEN.